US012795767B2

(12) United States Patent
Gao et al.

(10) Patent No.: US 12,795,767 B2
(45) Date of Patent: Nov. 10, 2026

(54) SYSTEM AND METHOD FOR DETERMINING A BEAM STATE OF A DOWNLINK SIGNAL IN A LINK RECOVERY PROCEDURE

(71) Applicant: ZTE CORPORATION, Shenzhen (CN)

(72) Inventors: Bo Gao, Shenzhen (CN); Zhaohua Lu, Shenzhen (CN); Ke Yao, Shenzhen (CN); Shujuan Zhang, Shenzhen (CN); Shijia Shao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 248 days.

(21) Appl. No.: 18/520,040

(22) Filed: Nov. 27, 2023

(65) Prior Publication Data

US 2024/0172316 A1 May 23, 2024

Related U.S. Application Data

(63) Continuation of application No. PCT/CN2022/071771, filed on Jan. 13, 2022.

(51) Int. Cl.
*H04B 7/06* (2006.01)
*H04L 5/00* (2006.01)
(Continued)

(52) U.S. Cl.
CPC ........... *H04W 76/19* (2018.02); *H04W 16/28* (2013.01); *H04W 52/08* (2013.01); *H04W 52/10* (2013.01);
(Continued)

(58) Field of Classification Search
None
See application file for complete search history.

(56) References Cited

U.S. PATENT DOCUMENTS 11,785,520 B2 * 10/2023 Gao ....................... H04B 7/088 370/331
12,452,791 B2 * 10/2025 Yao ..................... H04W 52/146
(Continued)

FOREIGN PATENT DOCUMENTS

| | | |
|---|---|---|
| CN | 110519815 A | 11/2019 |
| EP | 4 161 190 A1 | 4/2023 |
| WO | WO-2021/241212 A1 | 12/2021 |

OTHER PUBLICATIONS

Huawei et al., "Beam failure recovery", 3GPP TSG RAN WG1 Meeting #89 R1-1708135, May 19, 2017 (9 pages).
(Continued)

*Primary Examiner* — Sithu Ko
(74) *Attorney, Agent, or Firm* — Foley & Lardner LLP

(57) ABSTRACT

A system and method for simultaneously updating beam information and power controls for channels and reference signals in downlink and uplink signaling after receiving a base station response in a link recovery procedure, is disclosed. In one embodiment, an example wireless communication method comprises: receiving, by a wireless communication device, a response for link recovery, from a wireless communication node; and determining, by the wireless communication device according to a downlink reference signal, a beam state of a downlink signal, a defined number of time units after receiving the response for link recovery.

19 Claims, 9 Drawing Sheets

(51) Int. Cl.

| | |
|---|---|
| ***H04W 16/28*** | (2009.01) |
| ***H04W 52/08*** | (2009.01) |
| ***H04W 52/10*** | (2009.01) |
| ***H04W 52/24*** | (2009.01) |
| ***H04W 72/1273*** | (2023.01) |
| ***H04W 72/232*** | (2023.01) |
| ***H04W 76/19*** | (2018.01) |

(52) U.S. Cl.
CPC ..... *H04W 52/242* (2013.01); *H04W 72/1273* (2013.01); *H04W 72/232* (2023.01)

(56) References Cited

U.S. PATENT DOCUMENTS

| | | | | |
|---|---|---|---|---|
| 2020/0350972 | A1 | 11/2020 | Yi et al. | |
| 2020/0389884 | A1* | 12/2020 | Hakola | H04W 72/23 |
| 2021/0184749 | A1 | 6/2021 | Chen et al. | |
| 2021/0337453 | A1 | 10/2021 | Gao et al. | |
| 2022/0060302 | A1* | 2/2022 | Zhang | H04B 7/0404 |
| 2022/0322113 | A1* | 10/2022 | Zhang | H04B 7/06964 |
| 2023/0089446 | A1* | 3/2023 | Yao | H04B 7/088<br>370/329 |
| 2023/0114010 | A1* | 4/2023 | Zhu | H04W 24/08<br>370/329 |
| 2023/0354359 | A1* | 11/2023 | Yao | H04B 7/0456 |
| 2024/0064649 | A1* | 2/2024 | Go | H04W 52/262 |

OTHER PUBLICATIONS

International Search Report and Written Opinion for International Patent Appl No. PCT/CN2022/071771, mailed on Oct. 9, 2022 (8 pages).

Nokia et al., “Remaining timing relation aspects for NR over NTN”, 3GPP TSG RAN WG1 #107 R1-2110899, Nov. 19, 2021 (14 pages).

ZTE, “Discussion on mechanism to recovery from beam failure”, 3GPP TSG RAN WG1 Meeting #90 R1-1712300, Aug. 25, 2017 (9 pages).

Ericsson, “Enhancements to multibeam operation”, 3GPP TSG-RAN WG1 Meeting #98, Tdoc R1-1909225, Aug. 30, 2019, Prague, Czech Republic (23 pages).

Extended European Search Report for EP Appl. No. 22919418.8, dated Feb. 24, 2025 (10 pages).

ZTE, “Enhancements on multi-beam operation”, 3GPP TSG RAN WG1 Meeting #99, R1-1911931, Nov. 22, 2019, Reno, US (18 pages).

Fgi et al., “Discussion of enhancements on beam management for multi-TRP”, 3GPP TSG RAN WG1 #106-e, R1-2107298, Aug. 27, 2021, e-Meeting (6 pages).

Intel Corporation, “Multi-TRP enhancements for beam management”, 3GPP TSG RAN WG1 #106bis-e, R1-2109594, Oct. 19, 2021, e-Meeting (6 pages).

Interdigital Inc., “On Beam Management Enhancements for M-TRP”, 3GPP TSG RAN WG1 #104b-e, R1-2102435, Apr. 20, 2021, e-Meeting (4 pages).

ITRI, “Discussion on beam management for multi-TRP”, 3GPP TSG RAN WG1 #104-e, R1- 2101568, Feb. 5, 2021, e-Meeting (3 pages).

LG Electronics, “Enhancements on beam management for multi-TRP”, 3GPP TSG RAN WG1 #104-e, R1-2100621, Feb. 5, 2021, e-Meeting (9 pages).

Mediatek Inc., “Enhancement on beam management for multi-TRP”, 3GPP TSG RAN WG1 #106bis-e, R1-2109545, Oct. 19, 2021, e-Meeting (5 pages).

Notice of Reasons for Rejection for JP Appl. No. 2023-573138, dated Aug. 5, 2025 (with English translation, 6 pages).

NTT Docomo, Inc, “Discussion on multi-beam operation”, 3GPP TSG RAN WG1 #107-e, R1-2112089, Nov. 19, 2021, e-Meeting (14 pages).

CMCC, “Enhancements on multi-beam operation”, 3GPP TSG RAN WG1 #107-e, R1-2111597, Nov. 19, 2021, e-Meeting (7 pages).

Invitation to Respond to Written Opinion on SG Appl. No. 11202309067X dated Mar. 14, 2026 (11 pages).

Communication pursuant to Article 94(3) EPC for EP App. No. 22919418.8 dated Jun. 19, 2026 (6 pages).

* cited by examiner

SYSTEM AND METHOD FOR DETERMINING A BEAM STATE OF A DOWNLINK SIGNAL IN A LINK RECOVERY PROCEDURE

CROSS-REFERENCE TO RELATED APPLICATION

This application claims the benefit of priority under 35 U.S.C. § 120 as a continuation of International Patent Application No. PCT/CN2022/071771, filed on Jan. 13, 2022, the disclosure of which is incorporated herein by reference in its entirety.

TECHNICAL FIELD

The disclosure relates generally to wireless communications and, more particularly, to systems and methods for determining a beam state of a downlink signal in a link recovery procedure.

BACKGROUND

In 5G New Radio Access Technology (NR), analog beamforming is introduced into mobile networks to increase the robustness of high-frequency (e.g., above 6 GHz) communications. However, the directional transmission under analog beam-forming limits multipath diversity and makes high frequency communications vulnerable to channel fluctuations (e.g., human or vehicle blockage).

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication device includes receiving, by a wireless communication device, a response for link recovery, from a wireless communication node; and determining, by the wireless communication device according to a downlink reference signal, a beam state of a downlink signal, a defined number of time units after receiving the response for link recovery.

The method wherein at least one of: the downlink RS is indicated by a random access preamble signaling or a medium access control control element (MAC-CE) signaling, or the downlink RS is from a set of candidate RSes associated with the downlink signal.

The method comprising determining, by the wireless communication device, a beam state of an uplink signal according to: a physical random access channel (PRACH) transmission that most recently occurred, or the downlink RS.

The method wherein at least one of the beam state of the uplink signal or the beam state of the downlink signal comprises a spatial filter, for a primary cell (PCell), the beam state of the uplink signal is determined according to the PRACH transmission that most recently occurred, for a secondary cell (SCell) or a cell with at least one of: more than one RS sets for beam failure detection or more than one candidate RS sets, the beam state of the uplink signal is determined according to the downlink RS, or the beam state of the uplink signal is determined according to the downlink RS from a set of candidate RSes associated with the uplink signal.

The method wherein the downlink signal comprises at least one of: a physical downlink control channel (PDCCH), a physical downlink shared channel (PDSCH), or a channel state information reference signal (CSI-RS).

The method wherein the uplink signal comprises at least one of: a physical uplink control channel (PUCCH), a physical uplink shared channel (PUSCH), or a sounding reference signal (SRS).

The method comprising determining, by the wireless communication device, a power control parameter of the uplink signal, the power control parameter comprising at least one of: a pathloss RS, an open-loop parameter, or a closed loop index.

The method comprising determining, by the wireless communication device, the pathloss RS according to: the downlink RS, or the downlink RS from a set of candidate RSes associated with the downlink signal.

The method comprising determining, by the wireless communication device, the open-loop parameter according to an open-loop parameter with a specific index, wherein at least one of: the specific index is zero, a lowest or first value, or a highest or last value, the open-loop parameter comprises at least one of: a target power or a factor, the open-loop parameter with the specific index is from a group associated with the uplink signal, or the specific index is determined according to group information or type of control resource sets (CORESETs) of the uplink signal.

The method wherein when the uplink signal is associated with group information with an index of Y or a control resource set (CORESET) of a Y-th type, the method further comprises at least one of: determining, by the wireless communication device, the open-loop parameter according to an open-loop parameter with a specific index, the specific index being Y or Y−1; or determining, by the wireless communication device, the open-loop parameter according to an open-loop parameter with a Y-th lowest index, a Y-th index, a Y-th highest index, or a Y-th last index.

The method comprising determining, by the wireless communication device, the closed-loop index according to a specific value, wherein at least one of: the specific value is zero, a lowest or first value, or a highest or last value, the closed loop index of UL signal is determined according to group information associated with the uplink signal or the type of control resource sets (CORESETs) of the uplink signal, a value of a closed loop associated with the closed-loop index is reset, or the value of the closed loop associated with the closed-loop index is determined according to at least one of: a ramp-up value of a physical random access channel (PRACH) transmission, a transmit power control (TPC) command in a downlink control information (DCI) signalling carrying the response for link recovery, or a TPC command in a DCI signalling associated with the uplink signal.

The method wherein at least one of the downlink signal or the uplink signal is located in a component carrier (CC) within a CC list or in a bandwidth part (BWP) within a BWP list.

The method comprising determining, by the wireless communication device, the CC list, wherein: the CC list is determined as one that includes one or more CCs in which one or more beam states are indicated for one or more downlink signals or uplink signals simultaneously by a single signaling, the CC list is determined according to a radio resource control (RRC) parameter for indicating a CC list, as one that includes one or more CCs in which one or more beam states simultaneously apply to one or more downlink signals or uplink signals, or the CC list is determined, for the uplink signal, according to a RRC parameter for indicating a CC list with simultaneous spatial relation or spatial filter update.

The method comprising determining, by the wireless communication device, the beam state of the downlink signal in a first component carrier (CC) or first bandwidth part (BWP), according to a second downlink RS which is associated with the downlink RS, wherein at least one of: the second downlink RS and the downlink signal are in the first CC or first BWP, the second downlink RS is associated with the downlink RS via radio resource control (RRC) configuration or medium access control control element (MAC-CE) command, the second downlink RS and the downlink RS have a same RS index, the second downlink RS is determined according to at least one of: a RS index of the downlink RS or an offset that is configured via RRC or medium access control control element (MAC-CE) signaling, or the second downlink RS corresponds to a quasi co-location (QCL) type assumption.

The method wherein the defined number of time units is at least one of: 28, radio resource control (RRC) configured for beam state update, or determined according to a RRC configuration associated with a component carrier (CC) or bandwidth part (BWP) carrying the response for link recovery.

The method wherein a subcarrier spacing (SCS) corresponding to the defined number of time units is determined according to at least one of: a minimum value of one or more SCSes for: one or more component carriers (CCs) or bandwidth parts (BWPs) with link failure, and a CC or a BWP carrying the response for link recovery, a minimum value of one or more SCSes for one or more CCs or BWPs with link failure, or a minimum value of one or more SCSes for one or more CCs or BWPs within a CC list which is determined according to a radio resource control (RRC) parameter for indicating a CC list with simultaneous update of beam state.

The method wherein the defined number of time units is determined according to at least one of: a component carrier (CC) or bandwidth part (BWP) with a minimum value of one or more SCSes for: one or more CCs or BWPs with link failure and a CC or a BWP carrying the response for link recovery, a CC or BWP with a minimum value of one or more SCSes for one or more CCs or BWPs with link failure, or a CC or BWP with a minimum value of one or more SCSes for one or more CCs or BWPs within a CC list which is determined according to a radio resource control (RRC) parameter for indicating a CC list with simultaneous update of beam state.

The method further comprising determining, by the wireless communication device according to the downlink RS, the beam state of the downlink signal, starting from a first slot after the defined number of time units after receiving the response for link recovery, wherein the first slot is determined according to at least one of: a component carrier (CC) or bandwidth part (BWP) carrying the response for link recovery, or one or more CCs or BWPs with link failure.

The method further comprising determining, by the wireless communication device, the beam state of the uplink signal according to: the physical random access channel (PRACH) transmission that most recently occurred, or the downlink RS, starting from a first slot after the defined number of time units after receiving the response for link recovery, wherein the first slot is determined according to at least one of: a component carrier (CC) or bandwidth part (BWP) carrying the response for link recovery, or one or more CCs or BWPs with link failure.

The method wherein at least one of: one or more previously generated channel state information (CSI) reports are dropped after receiving the response for link recovery; or control resource sets (CORESETs) of a same type correspond to a same CORESET pool identifier (ID) or are not configured with a CORESET pool ID.

The method wherein the downlink or uplink signal, and the set of candidate RSes associated with the downlink or uplink signal, are associated with a group information or a type of control resource sets (CORESETs).

The method wherein at least one of: the group information comprises at least one of: information grouping one or more RSes, a resource set, a beam state set, a panel, a sub-array, an antenna group, an antenna port group, a group of antenna ports, a beam group, a physical cell index (PCI), an index of a transmission reception point (TRP), a CORESET pool identifier (ID), or a set of capabilities of the wireless communication device; the resource set comprises a RS set for beam failure detection; or the set of capabilities comprises a number of antenna ports or a number of layers.

The method wherein the group information or the type of CORESETs is associated with at least one of: a transmission configuration indicator (TCI) state or a group of TCI states, a CORESET or physical downlink control channel (PDCCH), a first type of physical downlink shared channel (PDSCH), a configured grant (CG) PDSCH, a physical uplink control channel (PUCCH) resource or a group of PUCCH resources, a first type of physical uplink shared channel (PUSCH), a CG PUSCH, a channel state information RS (CSI-RS) or a group of CSI-RSes, or a sounding RS (SRS) resource or a group of SRSes.

The method wherein the CORESET is configured with group information or a CORESET pool identifier (ID).

The method wherein at least one of: the first type of PDSCH is scheduled by a first CORESET or a first PDCCH, wherein the first CORESET or a CORESET associated with the first PDCCH is associated with the group information or corresponds to the type of CORESETs; the group information or the type of CORESETs is configured in a radio resource control (RRC) configuration for the CG PDSCH; or the CG PDSCH is initiated by a second CORESET or a second PDCCH, wherein the second CORESET or a CORESET associated with the second PDCCH is associated with the group information or corresponds to the type of CORESETs.

The method wherein at least one of: the first type of PUSCH is scheduled by a first CORESET or a first PDCCH, wherein the first CORESET or a CORESET associated with the first PDCCH is associated with the group information or corresponds to the type of CORESETs; the group information or the type of CORESETs is configured in a radio resource control (RRC) configuration for the CG PUSCH; or the CG PUSCH is initiated by a second CORESET or a second PDCCH, wherein the second CORESET or a CORESET associated with the second PDCCH is associated with the group information or corresponds to the type of CORESETs.

The method the CSI-RS or the group of CSI-RSes is indicated by a command signaling to share one or more beam states that are same as those of a first PDCCH or a first PDSCH.

The method wherein the SRS or the group of SRSes is indicated by a command signaling to share one or more beam states that are same as those of a first PUCCH or a first PUSCH.

The method wherein when a physical cell index (PCI) is associated with the beam state, a physical downlink control channel (PDCCH) or a control resource set (CORESET), physical random access channel (PRACH) configuration is associated with group information or the type of CORESET.

The method wherein when the downlink RS is identified from a first RS set associated with the PRACH configuration, a PRACH corresponding to the downlink RS is transmitted according to a mapping between at least one RS in the first RS set and a PRACH transmission occasion.

The method wherein a channel quality corresponding to a second RS set associated with the PRACH configuration, is worse than a threshold.

The method comprising determining, by the wireless communication device, a beam state of an uplink signal associated with the group information or the type of CORESETs, according to: a physical random access channel (PRACH) transmission that most recently occurred.

The method wherein a beam state indicating a unified transmission configuration indicator (TCI) state for a serving cell is provided or enabled.

In another implementation, a method performed by a wireless communication node includes sending, by the wireless communication node to a wireless communication device, a response for link recovery; and causing the wireless communication device to determine, according to a downlink reference signal, a beam state of a downlink signal, a defined number of time units after receiving the response for link recovery.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
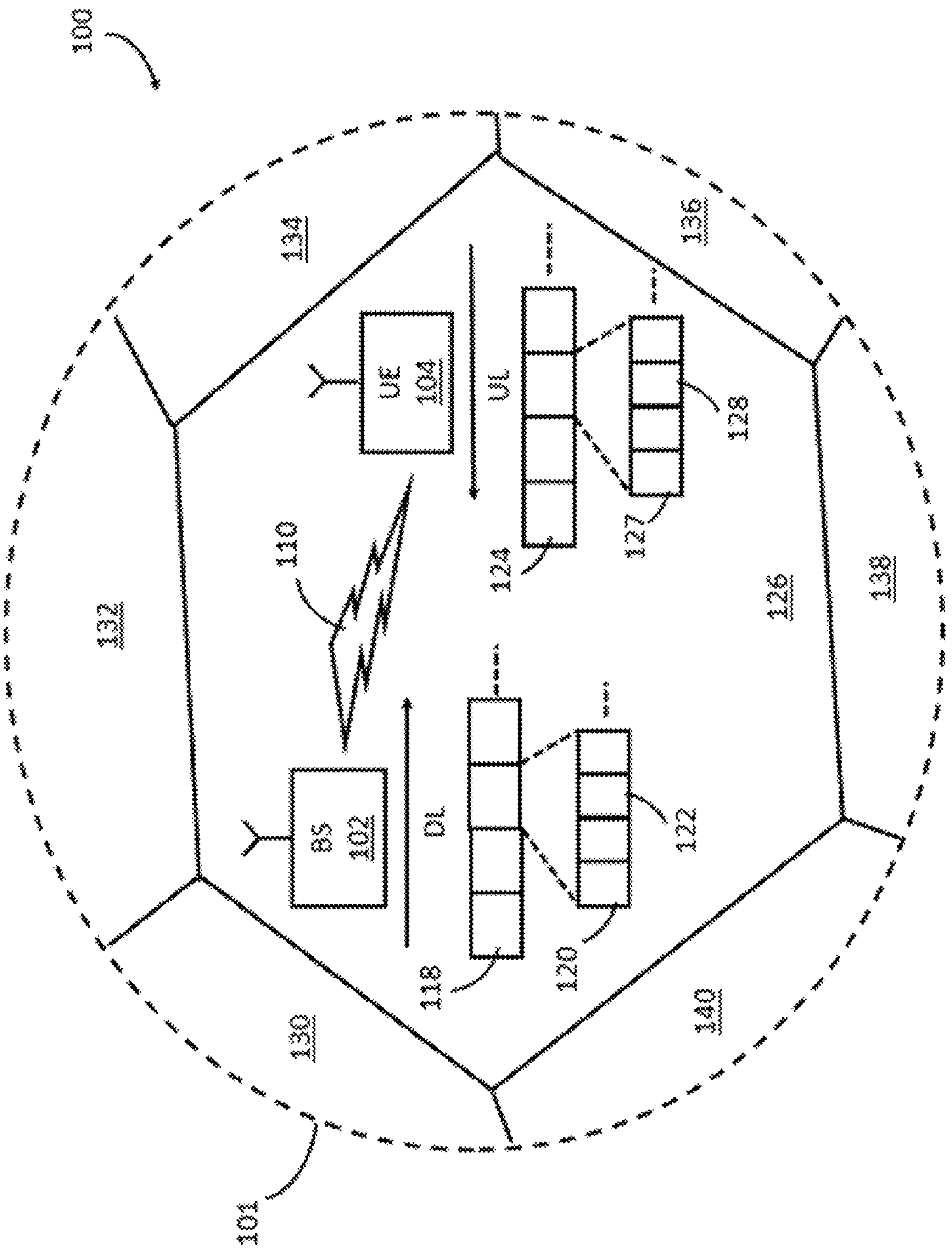
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station (BS) 102 and a user equipment device (UE) 104 that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink (DL) radio frame 118, and an uplink (UL) radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
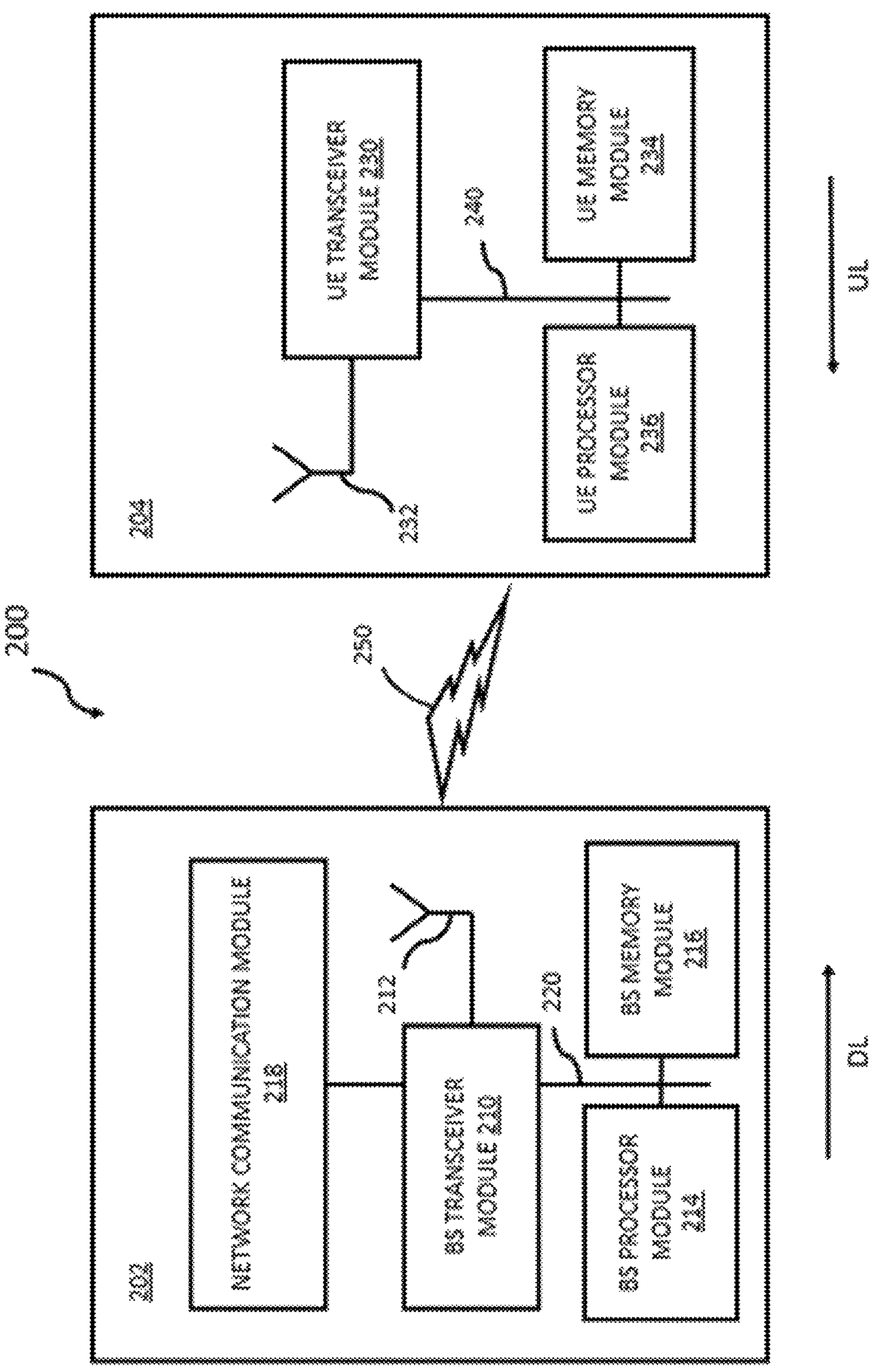
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a BS 202 and a UE 204. The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE), emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

High frequency communication protocols (e.g., ultra-wideband or wideband) are subject to propagation losses. In an effort to combat such losses, antenna array and beam-forming training technologies using massive multi-input multi-output (MIMO) (e.g., 1024 antenna elements configured for one antenna) have been adopted to achieve beam alignment to obtain an increased antenna gain. Variable phase-shift based beamforming training targets the identification of a best pattern for subsequent data transmission given pre-specified beam patterns. To support such antenna arrays and to maintain a low implementation cost, analog phase shifters may be used to implement mmWave beam-forming. Employing analog phase shifters results in a finite number of controlled phases and modulus constraints placed on the antenna elements.

Analog beam-forming, while increasing the robustness of high-frequency communications, is subject to channel fluctuations. To improve such channel robustness, link recovery procedures (also called beam recover procedures or beam failure recovery (BFR)) may be adopted for 5G NR. In some embodiments, BFR enables the UE to initialize event driven reporting of beam failure events and identify new beams for subsequent data transmissions. The link recovery procedure may apply to a primary cell (PCell), primary secondary cell (PSCell), secondary cell (SCell), and/or multi-transmit and receive points (TRP) operations (regardless of whether the cell is PCell or SCell).

Figure 3:
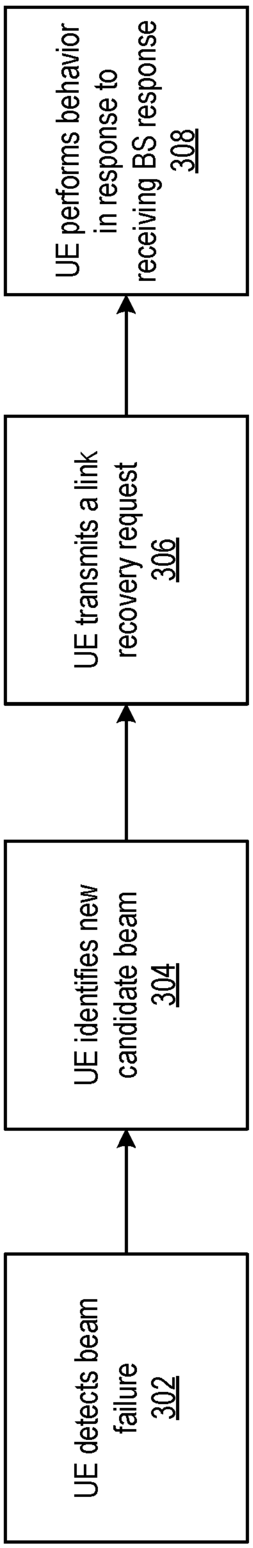
FIG. 3 illustrates an example of a contention free based link recovery in a PCell, PSCell, SCell, and/or TRP-specific BFR, in accordance with some implementations of the present disclosure.

FIG. 3 illustrates an example of a contention free based link recovery in a PCell, PSCell, SCell, and/or TRP-specific BFR, in accordance with some implementations of the present disclosure. In operation 302, the UE may detect a beam failure. The UE may detect a beam failure using block error ratio (BLER) determined by measuring one or more DL reference signals (RS). When the BLER of all (or a portion) of the DL RSes satisfies a threshold within a configured window, the UE may indicate a link failure using a medium access control (MAC) control element (CE). In these embodiments, the UE determines a link failure on the MAC layer. In other embodiments, the UE may receive an indication of a link failure from the physical (PHY) layer. The UE may increment a counter (e.g., BFI_COUNTER) by a defined amount (e.g., 1) for each indication of beam failure. When the UE determines that the BFI_COUNTER satisfies a threshold, the UE may determine that a beam failure event has occurred.

In operation 304, the UE may identify a new candidate beam. One or more DL RSes may be/include a candidate RS. The UE may identify the candidate beam (or the candidate DL RS) by measuring the layer 1 (L1) reference signal received power (RSRP). If the L1-RSRP associated with a DL RS satisfies a threshold, the DL RS may be identified as a new candidate beam. If the channel quality of multiple DL RSes satisfies a threshold, then any DL RS can be selected as a candidate beam (e.g., randomly).

In operation 306, the UE may initiate a physical random access channels (PRACH) based link recovery request (e.g., a beam failure recovery request BFRQ, a link failure recovery request). The UE initiates the link recovery request if a beam failure event is declared and/or at least one new candidate beam is found. The UE transmits the BFRQ to a BS. For PCell (or PSCell) link recovery, the UE may initiate one or more PRACH transmissions associated with the selected RS beam candidate (e.g., the beam candidate from step 304). For SCell link recovery and TRP-specific link recovery (e.g., for multi TRP operations), the UE may transmit the MAC-CE for BFR that carries failed carrier component (CC) indices. The UE may also transmit new candidate beams (e.g., from step 304) per failed CC via UL shared channel (UL-SCH) and/or PUSCH. If the UL-SCH and/or PUSCH is not available and/or can not accommodate the MAC-CE for BFR, the UE may transmit a dedicated service requirement (SR) (also referred to as PUCCH-BFR or link recovery request in PUCCH) via PUCCH. In operation 308, the BS may respond to the BFRQ request. The UE may receive the BS response (e.g., link recovery response) and can subsequently determine the beam state of a downlink signal. In some embodiments, after the UE receives the BS response, one or more previously generated CSI reports are dropped. Additionally or alternatively, control resource sets (CORESETs) of a same type may correspond to a same CORESET pool identifier (ID) or are not configured with a CORESET pool ID.

For link recovery procedures in a unified transmission configuration indicator (TCI) framework, the UE may update beam state/information and power control for various channels and RSes in DL and UL after receiving the BS response. In the unified TCI framework, physical downlink control channel (PDCCH), physical downlink sharing channel (PDSCH), channel state information reference signal (CSI-RS), physical uplink control channel (PUCCH), physical uplink sharing channel (PUSCH), and sounding reference signals (SRS) can be associated with the same TCI state/beam (including the quasi co-location (QCL) state, TCI state, spatial relation, RS, spatial filter, and/or pre-coding). Accordingly, updating the TCI state/beam (e.g., the QCL state, TCI state, spatial relation, RS, spatial filter, and/or pre-coding) simultaneously improves the link recovery procedure in the unified TCI framework.

For clarity of the specification, the spatial filter (or the spatial-domain filter) may be the UE spatial filter and/or the BS spatial filter. Moreover, the spatial relation (or the spatial relation information, including the beam, spatial parameter, and/or spatial domain filter) includes one or more reference RSes representing the same or QCL spatial relation between a targeted RS (or channel) and the one or more reference RSes. The QCL state can include one or more reference RSes and corresponding QCL type parameters (e.g., Doppler spread, Doppler shift, delay spread, average delay, average gain, and spatial Rx parameter). QCL states may include QCL assumptions such as QCL-TypeA indicating Doppler shift, Doppler spread, average delay, delay spread parameters; QCL-TypeB indicating Doppler shift and Doppler spread parameters; QCL-TypeC indicating the Doppler shift and average delay parameters; and QCL-TypeD indicating the spatial Rx parameter.

As described in the specification, it should be appreciated that a beam state may be interchanged with beam, QCL states, transmission configuration indicator (TCI) states, spatial relation (which may also be referred to as spatial relation information), RS, spatial filter, and/or precoding. Moreover, if not otherwise indicated, PCell may be interchangeable with a primary cell in a corresponding cell group (e.g., PSCell). Additionally, link recovery may be interchangeable with beam recovery, and PRACH may be interchangeable with random access preamble. As described herein, time unit may be interchangeable with sub-symbol, symbol, slot, frame, or transmission occasion. Similarly, as described herein, an open-loop parameter includes at least one of a target power (e.g., p0) and a factor (e.g., alpha). It should be appreciated if a DL or UL signal is not configured with group information or is not associated with a type of control resource set (CORESET), the DL signal or UL signal may be associated with the value of group information equal to zero or a first type of group information respectively.

A UE can receive TCI states according to downlink control information (DCI). The TCI state may include QCL relationships between the DL RS. As such, as used herein, the TCI state may be interchangeable with the QCL state. Similarly, the definition of a transmit/transmission (Tx) beam may be interchangeable with QCL state, TCI state, spatial relation state, DL RS, UL signal, Tx spatial filter, and/or Tx precoding. The definition of a receive/reception (Rx) beam may be interchangeable with QCL state, TCI state, spatial relation state, spatial filter, Rx spatial filter, and/or Rx precoding. The definition of a beam ID may be interchangeable with QCL state index, TCI state index, spatial relation state index, RS index, spatial filter index, and/or precoding index. The Physical Downlink Control Channel (PDCCH) is the physical channel that carries the DCI information. As such, as described herein, DCI and PDCCH may be interchangeable.

The RS can include channel state information reference signal (CSI-RS), synchronization signal block (SSB) (or synchronization signal (SS)/physical broadcast channel (PBCH)), demodulation reference signal (DMRS), sounding reference signal (SRS), and PRACH. As used herein, RS may also include the DL RS and/or the UL signal. As an example, the DL RS includes CSI-RS, SSB, DMRS (e.g., DL DMRS). The UL signal includes SRS, DMRS (e.g., UL DMRS) and PRACH. Generally, a UL signal may include PUCCH, PUSCH, and/or SRS transmissions. Similarly, a DL signal may include PDCCH, PDSCH, and/or CSI-RS transmissions.

Updating QCL/TCI state/beam simultaneously means considering various forms of latency (e.g., the latency associated with the UE decoding the BS response and beam update, and the latency after receiving the BS response (for PCEll, PSCell, SCell, and mTRP cases)). Moreover, the timeline of beam update may be based on beam application time of the TCI (state) update in the unified TCI and/or the timeline for BFR.

Figure 4:
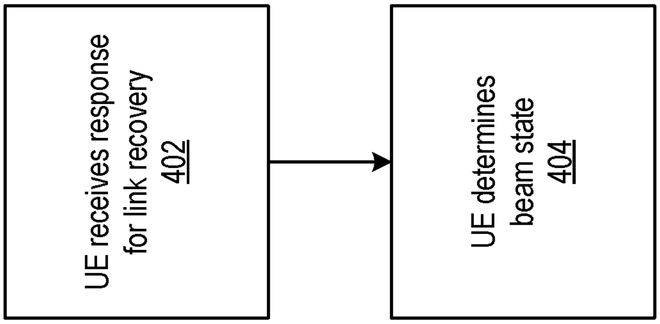
FIG. 4 illustrates an example method of determining a beam state of a DL signal, in accordance with some implementations of the present disclosure.

FIG. 4 illustrates an example method of determining a beam state of a DL signal, in accordance with some implementations of the present disclosure. In operation 402, the UE can receive a response for link recovery from a BS. For PCell (or PSCell) link recovery, the UE may receive the BS response by monitoring PDCCH in a dedicated CORESET and/or dedicated search space for link recovery (or beam recovery) according to the QCL parameter associated with the candidate DL RS. The CORESET is a resource set used to convey control information. The QCL parameter can include at least one of Doppler spread, Doppler shift, delay spread, average delay, average gain, or spatial parameter (which may also be considered the spatial Rx parameter). For SCell link recovery (or TRP specific link recovery for multi-TRP operations), the UE may receive the BS response by receiving DCI/PDCCH signaling scheduling a PUSCH transmission with the same hybrid automatic repeat request (HARQ) process number (and a toggled new data indicator (NDI) field) as the transmission of the PUSCH carrying the MAC-CE for BFR. Once the UE detects the BS response, the UE may update the QCL assumption for one or more CORESETs and can update the spatial filter (or spatial-domain filter) of PUCCH resources. The response for link recovery includes at least one of PDCCH signaling in a dedicated CORESET and/or a dedicated search space for link recovery (or beam recovery), DCI/PDCCH signaling with a toggled new data indicator (NDI) field, and/or scheduling a PUSCH transmission with the same HARQ process (e.g., same HARQ process number) as PUSCH carrying a MAC-CE for BFR.

In operation 404, the UE can determine a beam state of a DL signal at/after a defined number of time units after receiving the response for link recovery according to the candidate DL RS. After the defined number of time units from receiving the BS response, the UE can determine the beam state of the DL signal (e.g., including a PDCCH in a CORESET, a PDSCH, and a CSI-RS) according to the candidate DL RS (e.g., the candidate beam in step 304 of FIG. 3) indicated by a random access preamble signaling (e.g., a PRACH signaling) and/or MAC-CE signaling. The beam state of the DL signal may include a spatial filter. Additionally or alternatively, the UE determines the beam state of the DL signal according to the candidate DL RS from a set (e.g., new set) of candidate RSes (e.g., a new candidate RS set) associated with the DL signal.

The UE may also determine the beam state of a UL signal (e.g., including a PUCCH a PUSCH and a SRS) according to the candidate DL RS candidate or a previous (or most recent) PRACH transmission, where the beam state of the UL signal includes a spatial filter. Additionally or alternatively, the UE may determine the beam state of the UL signal according to the candidate DL RS from a new candidate RS set (e.g., candidate RSes) associated with the UL signal. For PCell/PSCell, the beam state of the UL signal is determined according to the previous (most recent) PRACH transmission and may include a spatial filter. For example, the UL signal may be transmitted using the same spatial domain filter as the previous PRACH transmission. For SCell or a cell with more than one beam failure detection RS set (e.g., for beam failure detection) and/or one or more candidate RS set (for new beam candidate beam identification), the beam state of the UL signal may be determined according to the candidate DL RS and may include a spatial filter.

The UE may update the power for UL signals after receiving the BS response (e.g., after the defined number of time units from receiving the BS response to the BFRQ in step 308 of FIG. 3). For example, the UE may determine the power control parameter(s) for the UL signal (e.g., the UL power control parameter or alternatively the power control parameter). The power control parameter(s) can include at least one or pathloss RS, open-loop parameter, or closed loop index. For clarity of the specification, closed loop index may be interchangeable with power control adjustment state.

The pathloss RS of the UL signal may be determined according to the candidate DL RS (e.g., the candidate beam in step 304). Additionally or alternatively, the pathloss RS of the UL signal may be determined according to a new candidate DL RS from an RS set (e.g., a new set of RSes or candidate RSes) associated with the UL signal. In an example, an UL signal may be associated with group information or a type of CORESETs (which may correspond to a TRP for example), and a new candidate RS set may be associated with a respective group information or type of CORESETS. When both the UL signal and new candidate RS set are associated with the same group information or a same/single type of CORESET, the UE may determine that the new candidate RS set is associated with the UL signal. Group information (e.g., specific to a TRP) can include information grouping one or more reference signals, resource sets, beam state sets, panels, sub-arrays, antenna groups, antenna port groups, groups of antenna ports, beam groups, physical cell index (PCI), TRP index, CORESET pool ID, and/or UE capability set. A resource set may include resources of a RS set for beam failure detection, and the UE capability set can include the capabilities of the UE (e.g., the number of antenna ports (e.g., SRS antenna ports), and/or the number of layers (e.g., for PUSCH or PDSCH)).

The open-loop parameter of the UL signal may be determined according to an open-loop parameter with a specific index. The specific index may be zero, lowest (first value), and/or highest (last value). The open-loop parameter can include a target power (e.g., p0) and/or a factor (e.g., alpha). The UE may determine the open-loop parameter of the UL signal according to an open-loop parameter (with a specific index) from a group associated with the UL signal. For example, given multiple groups each associated with group information and/or a type of CORESET(s), the UL signal may be associated with the group information and/or the type of CORESET(s). That is, the UE may determine the specific index associated with the open-loop parameter according to the group information of the UL signal and/or the type of CORESETs of the UL signal. When the UL signal is associated with group information with an index of Y (and Y is an integer), or a CORESET of the Y-th type, the UE may determine the open-loop parameter according to an open-loop parameter with a specific index. The specific index may be Y or Y−1. Additionally or alternatively, the UE may determine the open-loop parameter according to an open-loop parameter with a Y-th lowest index, a Y-th index, a Y-th highest index, and/or a Y-th last index (e.g., Y-th index counte backwards from the last index). In an example, there may be two types of UL signals. Each UL signal may be associated with a CORESET pool ID. Accordingly, the open-loop parameter of the UL signal associated with the first CORESET pool ID (e.g., CORESET Pool ID=0) is determined according to the open-loop parameter with index=0. The open-loop parameter of the UL signal associated with the second CORESET pool ID (e.g., CORESET Pool ID=1) is determined according to the open-loop parameter with index=1.

The UE may determine the closed loop index of the UL signal according to a specific value. The specific value may be zero, lowest (first value), and/or highest (last value). The UE may also determine the closed loop index of the UL signal according to group information associated with the UL signal and/or the type of CORESETs associated with the UL signal. When the UL signal is associated with the Y-th group information or the Y-th CORESET(s), and when Y is an integer, the specific value may refer to the lowest-Y, the first-Y, and/or Y−1. In an example, there may be two types of UL signals. Each UL signal may be associated with a CORESET pool ID. Accordingly, the closed loop index of the UL signal associated with the first CORESET pool ID (e.g., CORESET Pool ID=0) is 0. The closed loop index of the UL signal associated with the second CORESET pool ID (e.g., CORESET Pool ID=1) is 1.

The UE may also determine the closed loop index of the UL signal by setting a value of closed loop associated with a closed loop index to zero (e.g., resetting the value of the closed loop index). In an example, there may be two closed loops associated with a UE, each closed loop having a unique index. The closed loop associated with the closed loop index of the UL signal may be reset. Additionally or alternatively, the closed loop associated with the closed loop index of the UL signal may be reset to zero The UE may also determine the value of the closed loop associated with the closed-loop index using a transmit power control (TPC) command in DCI signaling associated with the DL signal. Additionally or alternatively, the UE may determine the value of the closed loop index associated with the closed loop according to a ramp-up value of a PRACH transmission (e.g., the last PRACH transmission before the BS response) and/or a TPC command in DCI carrying the BS response (e.g., the response for link recovery). For instance, if the UL signal is a first UL signal after a defined number of symbols from a last symbol of the first PDCCH reception, then the UE determines the value of the closed loop index corresponding to the UL signal. The UE may determine the value according to the ramp-up value of the previous PRACH transmission and the TPC command in a DCI format with cyclic redundancy check (CRC) scrambling by radio network temporary identifiers (RNTI) (e.g., C-RNTI and/or MCS-C-RNTI) that the UE detects in a first PDCCH reception in a search space set provided by recoverySearchSpaceId.

Figure 5:
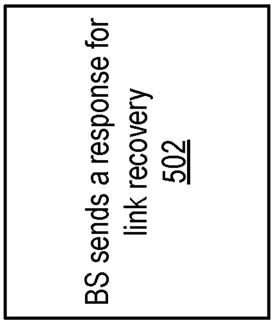
FIG. 5 illustrates another example method of determining a beam state of a DL signal, in accordance with some implementations of the present disclosure.

FIG. 5 illustrates another example method of determining a beam state of a DL signal, in accordance with some implementations of the present disclosure. In 502, a BS may transmit a response for link recovery to a UE. In some embodiments, the BS may transmit the response for link recovery in response to receiving a BFRQ indicating that a UE has identified a beam failure event and that the UE has identified a candidate beam. The response for link recovery may cause the UE to determine a beam state of a DL signal according to a candidate DL RS at/after a defined number of time units after receiving the response for the link recovery.

Figure 6:
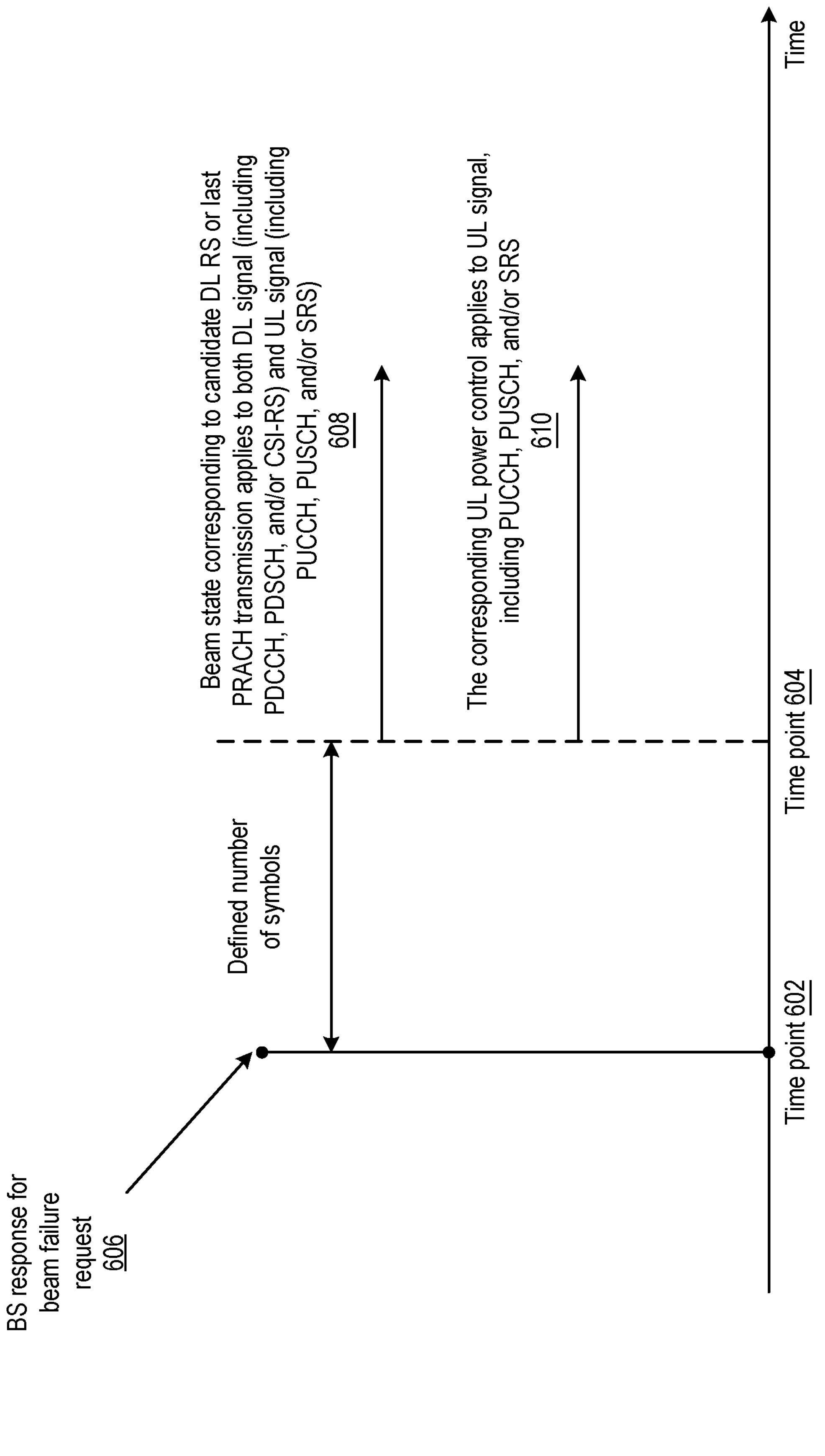
FIG. 6 illustrates an example implementation of the UE updating beam state/information and power control for DL and/or UL signal(s) after receiving the BS response, in accordance with some implementations of the present disclosure.

FIG. 6 illustrates an example implementation of the UE updating both the beam and power control for both DL and UL signal(s) after receiving the BS response (e.g., the BS response to the BFRQ in step 308), in accordance with some implementations of the present disclosure. As shown, the BS may transmit a response to the BFRQ at 606 at time 602. A defined number of symbols after receiving the BS response for the BFRQ (e.g., the MAC-CE for link recovery or PRACH) at time 602 (e.g., at time 604), the UE updates the beam state 608 and power control 610 simultaneously.

The UE may determine the beam state of the DL signal according to the candidate DL RS starting from a first slot after a defined number of time units after receiving the BS response. The first slot may be determined according to a component carrier (CC) or bandwidth part (BWP) carrying the BS response and/or one or more CCs or BWPs with link failure. The UE may also determine the beam state of a UL signal according to a PRACH transmission that most recently occurred and/or the candidate DL RS. The UE may determine the beam state of the UK signal starting from a first time slot after the defined number of time units after receiving the BS response. As discussed above, the first time slot may be determined according to the CC or BWP carrying the BS response and/or one or more CCs or BWPs with link failure.

The updated beam state (e.g., QCL assumption determined according to the candidate DL RS from the new candidate RS set) may correspond to the candidate DL RS applied to DL signal(s) including PDCCH, PDSCH, and/or CSI-RS. The updated beam state (e.g., spatial filter determined according to the candidate DL RS or previous PRACH transmission) may also correspond to the candidate DL RS applied to UL signal(s) including PUCCH, PUSCH, and/or SRS. As shown, the updated beam state 608 corresponding to the candidate DL RS and/or previous PRACH transmission (e.g., the PRACH transmission before the BS response 606 at time 602) applies to both the DL signal (including PDCCH, PDSCH, and/or CSI-RS) and the UL signal (PUCCH, PUSCH, and/or SRS).

As shown, in addition to updating the beam state 608, the UE may update the power control 610 (e.g., the pathloss RS, the open-loop parameter, and/or the closed loop index). The power control 610 applies to the UL signal including PUCCH, PUSCH and/or SRS.

It should be appreciated that while FIG. 6 illustrates a defined number of symbols between time 602 and time 604, where the time between time 602 and time 604 may be in any time unit including sub-symbols, slots, subframes, frames, or transmission occasions. In some embodiments, the defined number of time units is 28. In other embodiments, the defined number of time units is radio resource control (RRC) configured for DCI based beam state update. Additionally or alternatively, the defined number of time units is RRC configured in the CC or bandwidth part (BWP) carrying the response for link recovery (e.g., the BS response to the BFRQ in operation 308). For example, the beam application time may be configured per BWP per CC. Accordingly, the defined time is determined according to the configured beam application time in the active BWP carrying the BS response. In other embodiments, each of the time units may include an orthogonal frequency division multiplexing (OFDM) symbol or time slot.

The timeline of beam update (e.g., the number of time units) may be based on a sub carrier spacing (SCS). The UE may determine a SCS according to a minimum value of one or more SCS for one or more CCs or BWPs (e.g., active DL BWPs) with beam failure (or link failure), and a CC or BWP carrying the BS response (e.g., the response for link recovery). The UE may also determine the SCS corresponding to a minimum value of one or more SCSs for one or more CCs or BWPs (e.g., active DL BWPs) with link failure. The UE may also determine the SCS corresponding to a minimum value of one or more SCSs for one or more CCs or BWPs within a CC list. The UE may determine the CC list according to a RRC parameter. The RRC parameter may be used to indicate the CC list for simultaneous beam state updates on multiple CCs. In an example, the UE may determine the minimum value of SCS(s) for active BWP(s) in CC(s) with beam failure. In an alternate example, the UE may determine the minimum value of SCS(s) for active BWP(s) or CC(s) within the CC list.

The timeline of beam update (e.g., the number of time units, until the beam state is updated/applied for instance) may also be based on a CC or BWP with a minimum value of one or more SCSs for one or more CCs or BWPs with link failure and a CC or a BWP carrying the response for link recovery (e.g., the BS response). The timeline of beam update may also be based on a CC or BWP with a minimum value of one or more SCSs for one or more CCs or BWPs with link failure. Moreover, the number of time units may be determined by the UE based on a CC or a BWP with a minimum value of one or more SCSs for one or more CCs or BWPs within a CC list. The UE may determine the CC list according to a RRC parameter. The RRC parameter may be used to indicate the CC list for simultaneous beam state updates on multiple CCs.

Improving the link recovery procedure in the unified TCI framework may also include updating QCL/TCI state/beam simultaneously in the case of carrier aggregation (CA) and component carriers (CC). In the carrier aggregation (CA) scenario, the DL and UL signals are located in a CC within a list or in a BWP within a BWP list. The UE may update QCL/TCI state/beam for DL and UL channel(s) across CCs (e.g., across two CCs) by determining the QCL-TypeA or QCL-TypeC assumptions in a target CC in the CC list based on the new candidate DL RS beam in the reference CC. The reference CC may be the CC where the DL RS corresponding to the candidate DL RS is located.

The UE may determine the CC list as one that includes one or more CCs in which one or more beam states for one or more DL signals and the beam state for one or more UL signals are indicated simultaneously by a single signal. For example, the beam states for different DL or UL signals may be updated/indicated simultaneously using a single command such as MAC-CE or DCI signaling. The UE may also determine the CC list according to a RRC parameter that is used for indicating the CC list, as one that includes one or more CCs in which one or more beam states simultaneously apply to one or more DL or UL signals. For example, the RRC parameter may correspond to a same CC list as for a simultaneous TCI update list for PDSCH and/or PDCCH (e.g., simultaneous TCI-UpdateList1 or simultaneousTCI-UpdateList2) to save overhead of the RRC parameter. The UE may also determine the UL signal of the CC list according to a RRC parameter used to indicate a CC list with simultaneous spatial relation or spatial filter updates.

The UE may determine the beam state of a DL signal in a first CC or a first BWP according to a second DL RS associated with the candidate DL RS. In some embodiments, the second DL RS and the DL signal are in the first CC or first BWP. In some embodiments, the second DL RS is associated with the candidate DL RS via RRC configuration and/or MAC-CE commands. In some embodiments, the second DL RS and the candidate DL RS have a same RS index. In some embodiments, the second DL RS is determined according to a RS index of the candidate DL RS and/or an offset configured via RRC or MAC-CE signaling. For example, if the offset is configured to be 10, and the RS index of the candidate DL RS is 20, then the second DL RS may be 30 (e.g., offset+candidate DL RS). In some embodiments, the second DL RS may correspond to a QCL type assumption such as QCL-TypeA.

The UE may also improve the link recovery procedure in the unified TCI framework by updating QCL/TCI state/beam simultaneously in both single TRP (sTRP) operation and multi-TRP operation. The UE may divide the DL channels, UL channels, and RSes into two or more groups via explicit signaling. Each group (and its group information) may correspond to a TRP. Accordingly, the UE may update the beam (state/information) and power control according to each TRP.

For multi-TRP operation (e.g., for determining an association between DL/UL signal(s) and the candidate DL RS), the DL/UL signal and candidate RS set may be associated with group information (e.g., the same group information for each TRP) or a type of CORESETs (e.g., corresponding/specific to the same TRP).

Figure 7:
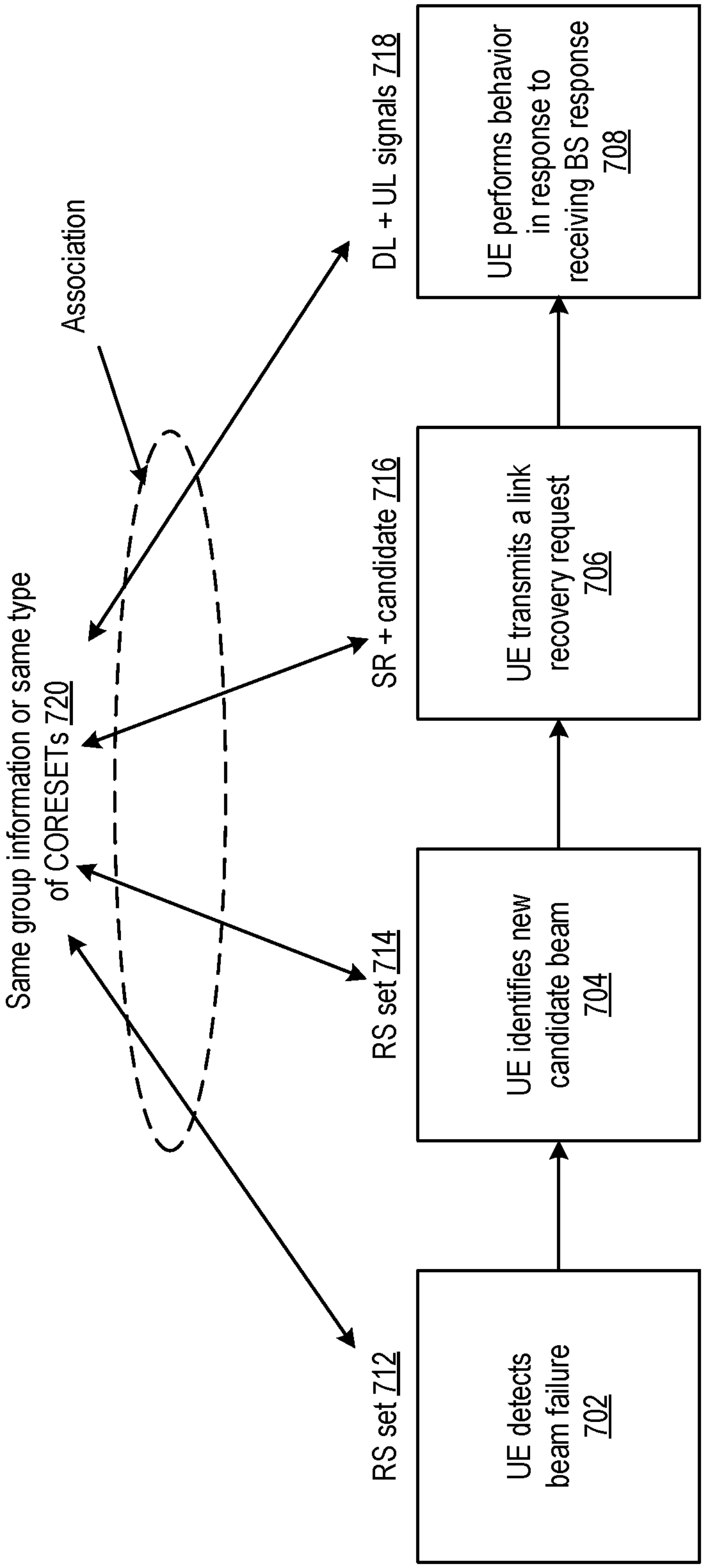
FIG. 7 illustrates an example TRP specific link recovery procedure, in accordance with some implementations of the present disclosure.

FIG. 7 illustrates an example TRP-specific link recovery procedure, in accordance with some implementations of the present disclosure. Operation 702 may be similar in structure and function to operation 302 in FIG. 3. In operation 702, the UE detects a beam failure in a RS set (e.g., RS set 712). Operation 704 may be similar in structure and function to operation 304 in FIG. 3. In operation 704, the UE identifies a candidate RS set for new beam identification (e.g., RS set 714). Operation 706 may be similar in structure and function to operation 306. In operation 706, the UE transmits a link recovery request to the BS (e.g., a BFRQ) via PUCCH signaling and MAC-CE. The link recovery request may include the SR and the candidate beam 716. Operation 708 may be similar in structure and function to operation 308 in FIG. 3. In operation 708, the UE may receive the BS response and perform a behavior/action/procedure. As shown, the UE updates DL and UL signals 718. The RS set 712, RS set 714, SR+candidate 716, and DL/UL signals 718 may each be associated with one type of CORESET 720 via RRC parameter CORESETPoolID and/or group information. Based on the framework, the candidate beam (or candidate DL RS) may be applied to the DL and UL signals 718 associated with the same group information and/or the same type of CORESETs (e.g., for determining PL-RS and beam state).

As described herein, the same type of CORESETs may correspond to the same CORESET pool ID (and/or same TRP). Moreover, group information can include information grouping one or more reference signals, resource sets, beam state set, panels, sub-arrays, antenna groups, antenna port groups, groups of antenna ports, beam groups, physical cell index (PCI), TRP index, CORSET pool ID, and/or UE capability set. The resource set may include resources of the beam failure detection RS set, and the UE capability set includes the capabilities of the UE (e.g., the number of antenna ports (e.g., SRS antenna ports), and/or the number of layers (e.g., for PUSCH or PDSCH)). The group information may represent a UE panel and one or more features related to the UE panel. Moreover, the group information may represent (or correspond to) the TRP and one or more features related to the TRP.

Figure 8:
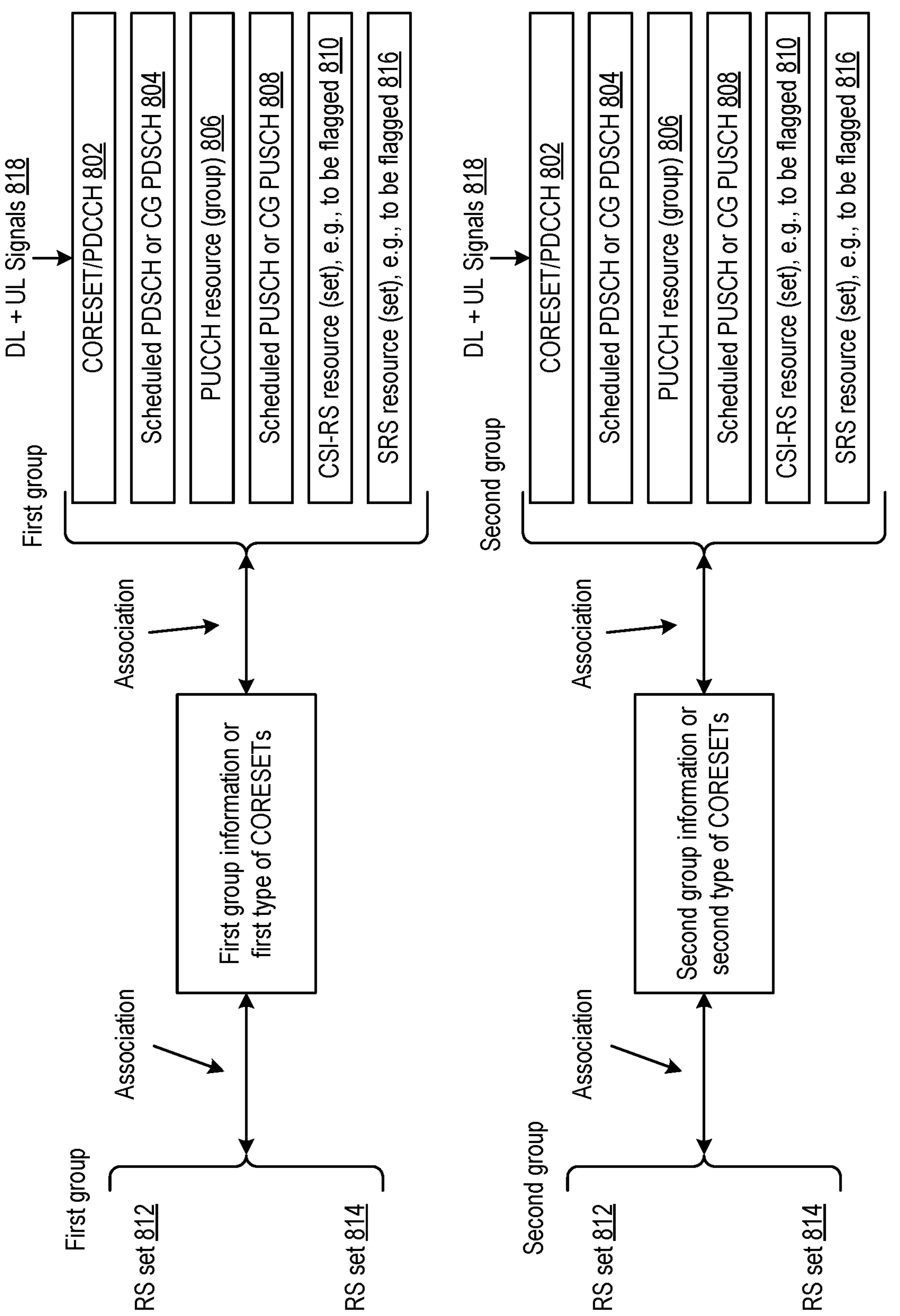
FIG. 8 illustrates a framework for association between one group information or type of CORESET, and groups of RS sets and DL/UL signals, in accordance with some implementations of the present disclosure.

Referring to FIG. 8, depicted is a framework for association between one group information/type of CORESET and groups of RS sets and DL/UL signals, in accordance with some implementations of the present disclosure. RS set 812 may correspond to the RS set 712 of FIG. 7, and RS set 814 may correspond to the RS set 714 of FIG. 7. As shown, group information or one type of CORESET can be associated with a TCI state and/or TCI state group. Each TCI state may be associated with an individual group information or an individual type of CORESET. Additionally or alternatively, one TCI state group may be associated with an individual group information or an individual type of CORESET to save/minimize/reduce RRC overhead. Additionally or alternatively, group information or one type of CORESET can be associated with a CORESET and/or a PDCCH 802. The CORESET may be configured with the group information or a CORESET Pool ID which may be used to indicate (or correspond to) a TRP in the multi-TRP environment.

Additionally or alternatively, group information or one type of CORESETs can be associated with a first type of PDSCH 804 (e.g., PDSCH scheduled by DCI such as by DCI format 1_0/1/2). In these embodiments, when the CORESET is associated with one type of CORESETs (e.g., CORESET Pool ID=0 or not configured with CORESET Pool ID), the PDSCH scheduled by DCI in the CORESET may be associated with the same type of CORESETs (e.g., CORESET Pool ID=0). The first type of PDSCH may be scheduled by a first CORESET or first PDCCH, where the first CORESET or a CORESET associated with the first PDCCH is associated with the group information or corresponds to (or matches) the type of CORESETs. The group information or one type of CORESETs can be associated with a configured grant (CG) PDSCH 804. In these embodiments, the group information or the type of CORESETs can be configured in an RRC configuration for CG PDSCH (e.g., for Type-I CG PDSCH in NR). The CG PDSCH may be initiated by a first CORESET and/or a first PDCCH. The first CORESET or a CORESET associated with the first PDCCH that initiated the CG PDSCH may be associated with the group information or correspond to the type of CORESETs (e.g., for Type-II CG PDSCH in NR). In an example, when the CORESET is associated with a group information (e.g., CORESET Pool ID or PCI), the PDSCH initiated by the PDCCH in the CORESET may be associated with the same group information.

Additionally or alternatively, group information or one type of CORESETs can be associated with a PUCCH resource and/or a PUCCH resource group 806. The association between the group information or the one type of CORESETs may be per PUCCH resource group. Accordingly, each PUCCH resource in the group may be associated with the group information and/or the type of CORESETs.

Additionally or alternatively, group information or a type of CORESETs can be associated with a first type of PUSCH 808 (e.g., PUSCH scheduled by DCI such as by DCI format 1_0/1/2). In these embodiments, when the CORESET is associated with the one type of CORESETs (e.g., CORESET Pool ID=1), the PDSCH scheduled by DCI in the CORESET may be associated with the same type of CORESETs (e.g., CORESET Pool ID=1). The first type of PUSCH may be scheduled by a first CORESET or a first PDCCH, where the first CORESET or a CORESET associated with the first PDCCH is associated with the group information or corresponds to the type of CORESETs. The group information or a type of CORESETs (sometimes referred to interchangeably as 'type of CORESET' or type of CORESET(s)') can be associated with a CG PUSCH 808. In these embodiments, the group information or the type of CORESETs can be configured in an RRC configuration for CG PUSCH (e.g., for Type-I CG PUSCH in NR). The CG PUSCH may be initiated by a first CORESET and/or a first PDCCH. The first CORESET or a CORESET associated with the first PDCCH that initiated the CG PUSCH may be associated with the group information or correspond to the type of CORESETs (e.g., for Type-II CG PUSCH in NR). In an example, when a CORESET is associated with the group information (e.g., CORESET Pool ID or PCI), the CG PUSCH initiated by a PDCCH in the CORESET may be associated with the same group information.

Additionally or alternatively, group information or a/one type of CORESET can be associated with a CSI-RS resource and/or a group of CSI-RS resources 810. The CSI-RS resource and/or CSI-RS resource group may be indicated by a command (e.g., using a flag) signaling to share one or more beam states that are same as those of as PDCCH and/or PDSCH signaling.

Additionally or alternatively, group information or a/one type of CORESET can be associated with an SRS resource and/or a group of SRS resources 816. The SRS resource and/or SRS resource group may be indicated by a command (e.g., using a flag) signaling to share one or more beam states that are same as those of a PUCCH and/or PUSCH signaling.

The UE may also improve the link recovery procedure in the unified TCI framework by updating QCL/TCI state/beam simultaneously in one serving cell served by at least two PCells (e.g., inter-cell link recovery procedure). The UE may be configured with two TCI states for inter-cell beam management/mobility. Each TCI state may correspond to a particular group information or type of CORESET. For PCell (or PSCell) link recovery procedure, the UE may employ cell-specific PRACH based transmission in an inter-cell multi-TRP operation. When the PCI is associated with a beam state, a PDCCH, and/or a CORESET, then a PRACH configuration (based on the last PRACH transmission) may be associated with the group information or the type of CORESET.

Figure 9:
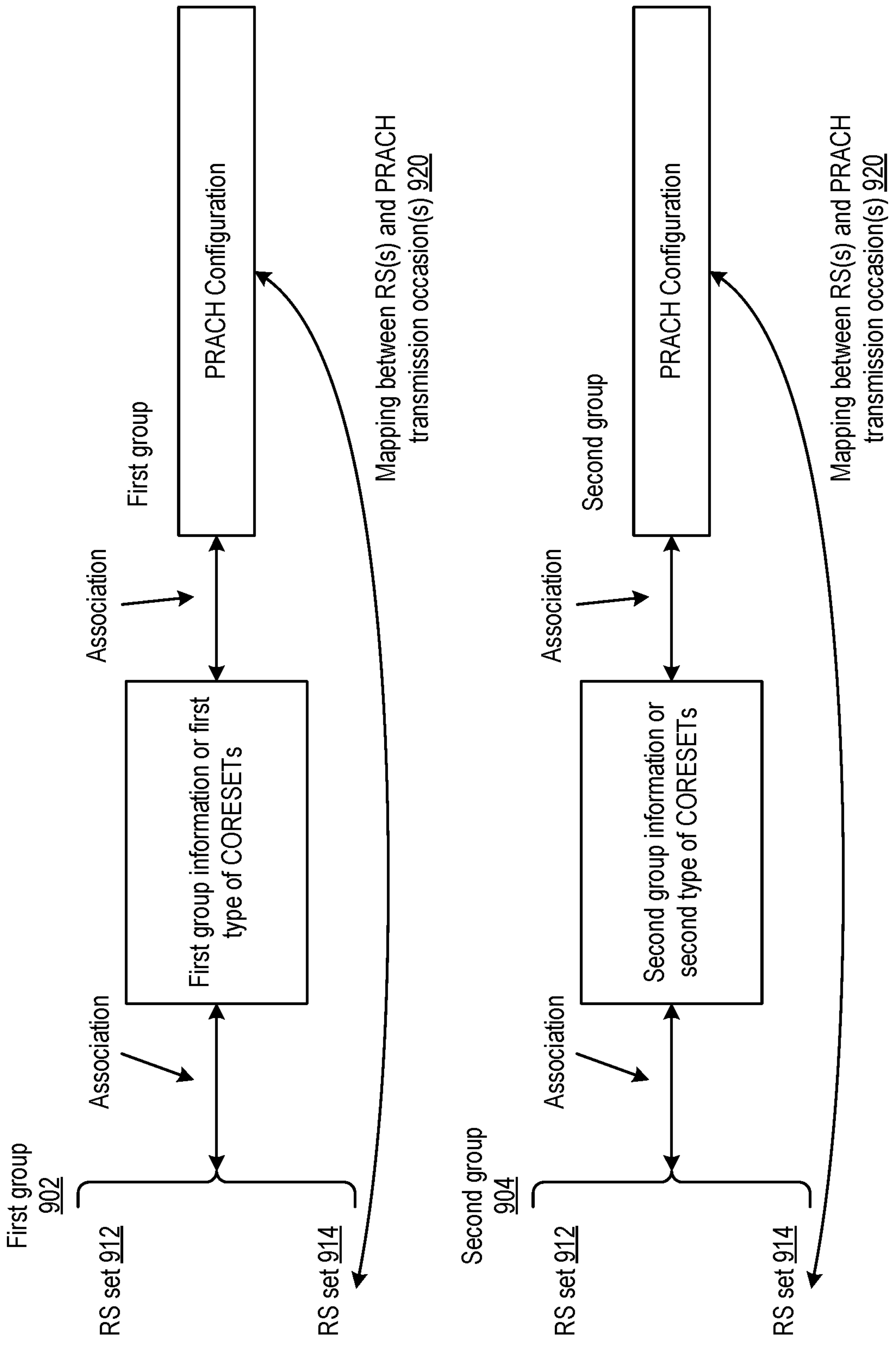
FIG. 9 illustrates a framework for PRACH association for a candidate RS set in a PRACH based inter-cell link recovery procedure, in accordance with some implementations of the present disclosure.

FIG. 9 illustrates a framework for PRACH association for a candidate RS set in the PRACH based inter-cell link recovery procedure, in accordance with some implementations of the present disclosure. Each group in FIG. 9 (e.g., first group 902 and second group 904) may correspond to one cell (e.g., a serving cell and/or non-serving cell (such as a TRP with different PCI from the serving cell). As shown, if the beam failure event corresponding to the RS set 912 (corresponding to the RS set 712 of FIG. 7) is identified in one cell, and further if a new candidate RS is identified from the RS set 914 (corresponding to the RS set 714 of FIG. 7), the PRACH corresponding to the candidate DL RS is transmitted according to a mapping 920 between at least one RS in the new candidate RS set and a PRACH transmission occasion. A channel quality may correspond to an RS set (e.g., RS set 914) associated with the PRACH configuration if the channel quality satisfies a threshold (e.g., a threshold channel quality). In an example, the RS set (e.g., RS set 914) may correspond to the beam failure detection RS set. Accordingly, the channel quality corresponding to the beam failure is worse than (or inferior to) a threshold. As BLER may be an example metric in detecting beam failure, the BLER associated with the channel quality is inferior to (or worse than) a metric.

The UE may determine a beam state (e.g., a spatial filter) for a UL signal according to a PRACH transmission associated with the UL signal (e.g., corresponding to the same group information/PCI). That is, the beam state of the UL signal associated with the group information or the type of CORESETs may be determined according to the PRACH transmission that most recently occurred. In these embodiments, the beam state indicating the unified TCI state for a serving cell (e.g., PCell/PSCell) may be provided and/or enabled.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method comprising:

receiving, by a wireless communication device, a response for link recovery, from a wireless communication node; and determining, by the wireless communication device according to a candidate downlink reference signal (RS) associated with a type of control resource sets (CORESETs) configured with a CORESET pool identifier (ID), a beam state of a downlink signal associated with the type of CORESETs, a predefined number of time units after receiving the response for link recovery, wherein the candidate downlink RS is of a set of candidate RSs associated with the downlink signal and associated with the type of CORESETs.

2. The method of claim 1, comprising:

determining, by the wireless communication device, a beam state of an uplink signal according to the candidate downlink RS.

3. The method of claim 2, wherein at least one of the beam state of the uplink signal comprises a spatial filter.

4. The method of claim 2, comprising:

determining, by the wireless communication device, a power control parameter of the uplink signal, the power control parameter comprising at least one of: a pathloss RS, an open-loop parameter, or a closed loop index.

5. The method of claim 4, wherein the power control parameter indicates a pathloss RS, the method comprising:

determining, by the wireless communication device, the pathloss RS according to:

the candidate downlink RS.

6. The method of claim 4, comprising:

determining, by the wireless communication device, the open-loop parameter according to an open-loop parameter with a specific index, wherein the specific index is a lowest value.

7. The method of claim 4, wherein the power control parameter comprises a closed-loop index, the method comprising:

determining, by the wireless communication device, the closed-loop index according to a specific value, wherein the specific value is a lowest value.

8. The method of claim 1, wherein the predefined number of time units is 28.

9. The method of claim 2, wherein the uplink signal, and a set of candidate RSs associated with the uplink signal, are associated with the type of CORESETs.

10. The method of claim 9, wherein the type of CORESETs is associated with at least one of:

a transmission configuration indicator (TCI) state, a physical downlink control channel (PDCCH), a first type of physical downlink shared channel (PDSCH), a first type of physical uplink shared channel (PUSCH), a channel state information RS (CSI-RS), or a sounding RS (SRS) resource.

11. The method of claim 10, wherein the first type of PDSCH is scheduled by a first PDCCH, wherein a first CORESET associated with the first PDCCH corresponds to the type of CORESETs.

12. The method of claim 10, wherein the first type of PUSCH is scheduled by a first PDCCH, wherein a first CORESET associated with the first PDCCH corresponds to the type of CORESETs.

13. The method of claim 10, wherein the CSI-RS or a group of CSI-RSs is indicated by a command signaling to share one or more beam states that are same as those of a first PDCCH.

14. The method of claim 10, wherein the SRS or a group of RSs is indicated by a command signaling to share one or more beam states that are same as those of a first PUCCH or a first PUSCH.

15. A method comprising:

sending, by a wireless communication node to a wireless communication device, a response for link recovery;

wherein the response for link recovery causes the wireless communication device to determine, according to a candidate downlink reference signal (RS) associated with a type of control resource sets (CORESETs) configured with a CORESET pool identifier (ID), a beam state of a downlink signal associated with the type of CORESETs, a predefined number of time units after receiving the response for link recovery, wherein the candidate downlink RS is of a set of candidate RSs associated with the downlink signal and associated with the type of CORESETs.

16. A wireless communication node, comprising:

at least one processor configured to:

send, via a transmitter to a wireless communication device, a response for link recovery;

wherein the response for link recovery causes the wireless communication device to determine, according to a candidate downlink reference signal (RS) associated with a type of control resource sets (CORESETs) configured with a CORESET pool identifier (ID), a beam state of a downlink signal associated with the type of CORESETs, a predefined number of time units after receiving the response for link recovery, wherein the candidate downlink RS is of a set of candidate RSs associated with the downlink signal and associated with the type of CORESETs.

17. A wireless communication device, comprising:

at least one processor configured to:

receive, via a receiver, a response for link recovery, from a wireless communication node; and determine, according to a candidate downlink reference signal (RS) associated with a type of control resource sets (CORESETs) configured with a CORESET pool identifier (ID), a beam state of a downlink signal associated with the type of CORESETs, a predefined number of time units after receiving the response for link recovery, wherein the candidate downlink RS is of a set of candidate RSs associated with the downlink signal and associated with the type of CORESETs.

18. The wireless communication device of claim 17, wherein the at least one processor is configured to:

determine a beam state of an uplink signal according to the downlink RS.

19. The wireless communication device of claim 18, wherein at least one of the beam state of the uplink signal comprises a spatial filter.

* * * * *